United States Patent

[11] 3,624,538

[72] Inventors Edward A. Gere
Piscataway;
Hans P. Lie, Berkeley Heights, both of N.J.
[21] Appl. No. 826,496
[22] Filed May 21, 1969
[45] Patented Nov. 30, 1971
[73] Assignee Bell Telephone Laboratories, Incorporated
Murray Hill, Berkeley Heights, N.J.

[54] TIME MULTIPLEXER WITH FEEDBACK
4 Claims, 4 Drawing Figs.

[52] U.S. Cl. .......... 330/84, 328/104, 330/85
[51] Int. Cl. .......... H03f 1/36, H03f 3/68
[50] Field of Search .......... 330/30, 51, 84–86; 328/104

[56] References Cited

UNITED STATES PATENTS

| | | | |
|---|---|---|---|
| 2,863,049 | 12/1958 | Lee et al. | 328/104 UX |
| 2,974,285 | 3/1961 | Schenck | 328/104 X |
| 3,135,874 | 6/1964 | Lucas et al. | 328/104 X |
| 3,152,319 | 10/1964 | Gordon et al. | 328/104 X |

*Primary Examiner*—John Kominski
*Assistant Examiner*—James B. Mullins
*Attorneys*—R. J. Guenther and Edwin B. Cave

ABSTRACT: Time-multiplexing networks for analog signals are subject to spurious transmissions such as leakage signals and switching transients. This disclosure proposes to solve these problems by the provision of a feedback path from the common portion of the network to each of the input branches, each feedback loop containing at least one active device. In addition to the above advantages, such a network realizes all of the usual advantages accruing from the application of feedback to an amplifier.

INVENTORS E. A. GERE
H. P. LIE
BY George S. Indig
ATTORNEY

TIME MULTIPLEXER WITH FEEDBACK

BACKGROUND OF THE INVENTION

1. Field of the Invention

The invention disclosed here is in the field of active gated networks in which multiple inputs are transferred to a common output.

2. Description of the Prior Art

In many fields the need arises to couple a set of analog inputs to a common output. Such need arises, for instance, in the field of nuclear pulse spectroscopy where information from several sensors is to be proceeded in a single pulse analyzer, or in telephony where several sources of speech information are to be transmitted through single channels. In many cases this need is satisfied by the connection of a set of simple switches to a common point. The closing of a particular switch connects that channel to the common output. If signal gain is required amplifiers can be included either in the common portion, in the separate channels or in both places. Another possibility is the use of gated amplifiers in place of simple switches.

Active switched networks such as those considered here are subject to several types of transmission error. Problems of gain stability and zero drifts are common to all active networks. Switching transients and pedestal are peculiar to switched networks. Branched networks typically suffer from spurious transmission of signals through deactivated branches, in addition to the continuous transmission of noise from all branches to the common point.

The prior art includes many solutions for all of these problems. Many of these solutions however involve complex circuitry in which high-quality elements are carefully matched and delicately balanced.

SUMMARY OF THE INVENTION

These problems are solved in this disclosure by the inventive provision of feedback from the common portion of the network to each of the input branches. In addition to all of the benefits which would ordinarily accrue from the provision of feedback to an active device, the disclosed usage of feedback provides active suppression of leakage signals transmitted through deactivated branches. Reduction of switching transients is also realized if the network under consideration or the ancillary networks are so arranged as to insure that the feedback loop is always closed through at least one activated branch.

The disclosed network is versatile and economical. It can be adapted to suit a wide range of applications in fields as diverse as nuclear pulse spectroscopy and voice transmission multiplexing.

DETAILED DESCRIPTION

1. Basic Network and General Considerations

Figure 2:
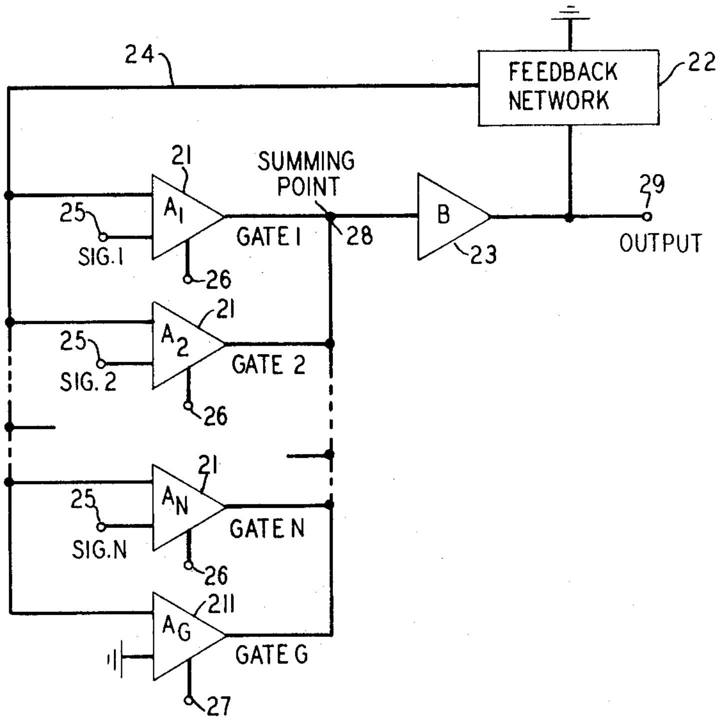
FIG. 2 is a schematic representation of a device of the disclosed class employing a common feedback network and an additional grounded-input amplifier in the array.
Figure 1:
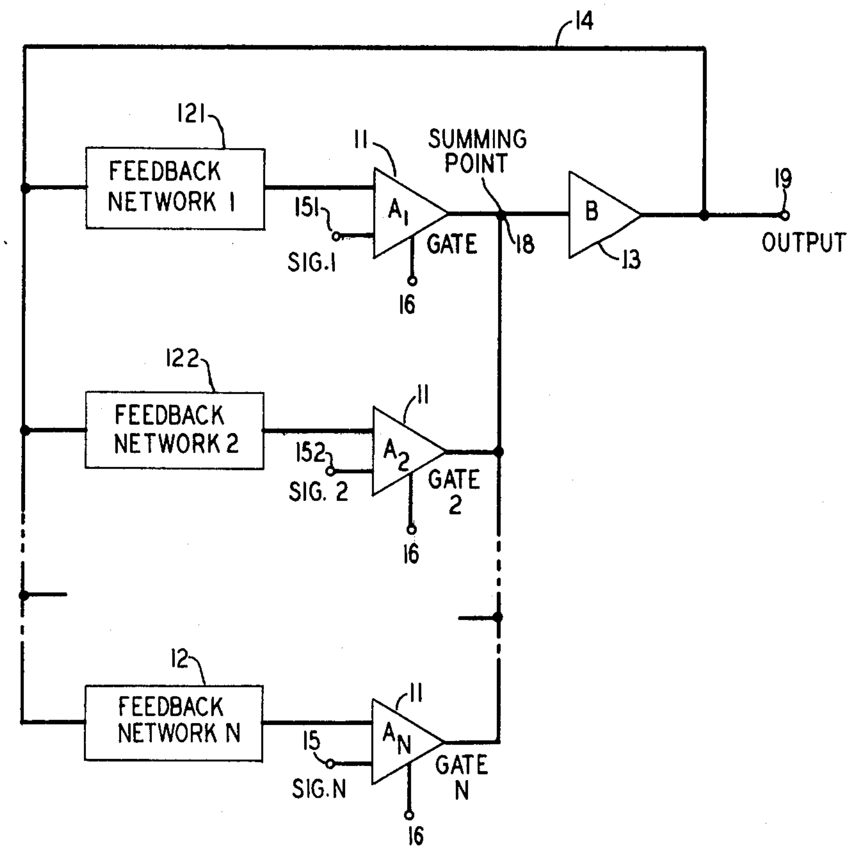
FIG. 1 is a schematic representation of a device of the disclosed class in which separate feedback networks are employed.

Some basic network forms are illustrated in FIGS. 1 and 2.

FIG. 1 shows, schematically, how the outputs of an array of gated amplifiers 11 are connected to a summing point 18 at the input of additional amplifier 13. A path 14 is provided for feeding this signal back through feedback networks 12 to the inputs of the array of amplifiers 11. It is preferable that the source of the gating signals be arranged in such a way as to insure that one of the amplifiers 11 is activated at all times. This will keep the feedback loop closed and greatly suppress any switching transient. In addition, FIG. 1 shows separate feedback networks 12, included either to enable the closed loop gain through each of the amplifiers to be separately chosen or for practical circuit reasons. If the circuit designed considers it advantageous, a common feedback network can be provided, as illustrated in FIG. 2.

In operation, one of the amplifiers 11 of the array in FIG. 1, for instance the uppermost, is activated. Any information signal arriving at that signal input port 151 is amplified and transmitted through the summing point 18 to the input of amplifiers 13. The amplified signal then passes to the output port 19 and through the feedback path 14 to the feedback network 12 where it causes degeneration of the amplified signal to correspond to the designed closed loop gain. If, at the same time, a signal is presented to the signal input port of a deactivated amplifier 152, an attenuated leakage signal will, in general, be transmitted to the summing point 18. This spurious leakage signal will pass around the activated feedback loop and be degenerated by the gain of uppermost amplifier 11. Thus, the leakage signal is actively suppressed by an amount equal to the gain of the activated amplifier 11.

FIG. 2 shows a network which is different from the above in two respects. First, there is a common feedback network 22 so that the loop gain through each of the branches is the same. Secondly, there is an additional amplifier 211 whose signal input is tied to ground. The source of the gating signals is arranged so that this amplifier is activated when none of the others in the array are activated. In this way a ground reference is provided in systems which operate on a low-duty cycle and noise produced in all of the other amplifiers 21 is degenerated. In some situations a reference voltage other than zero may prove useful. The gating signal to this additional amplifier 211 can be provided by the external source or by internal circuitry.

2. Network Variations

The proposed network is versatile in that various of its advantages can be emphasized or deemphasized depending upon the particular network element choice. For instance, amplifiers 13 and 23 can be replaced by a passive element. In this case, however, the gains of amplifiers 11 and 21 must be increased proportionately to maintain the same level of loop degeneration. Here the economy of having many relatively inexpensive amplifiers and a single, usually more expensive output amplifier is sacrificed.

At the other extreme elements 11 and 21 can be simple switches, all of the gain being invested in amplifiers 13 and 23. In this case, the advantage of suppression of feed through signals is lost, but the advantages of gain stability and transient suppression are retained.

Figure 3:
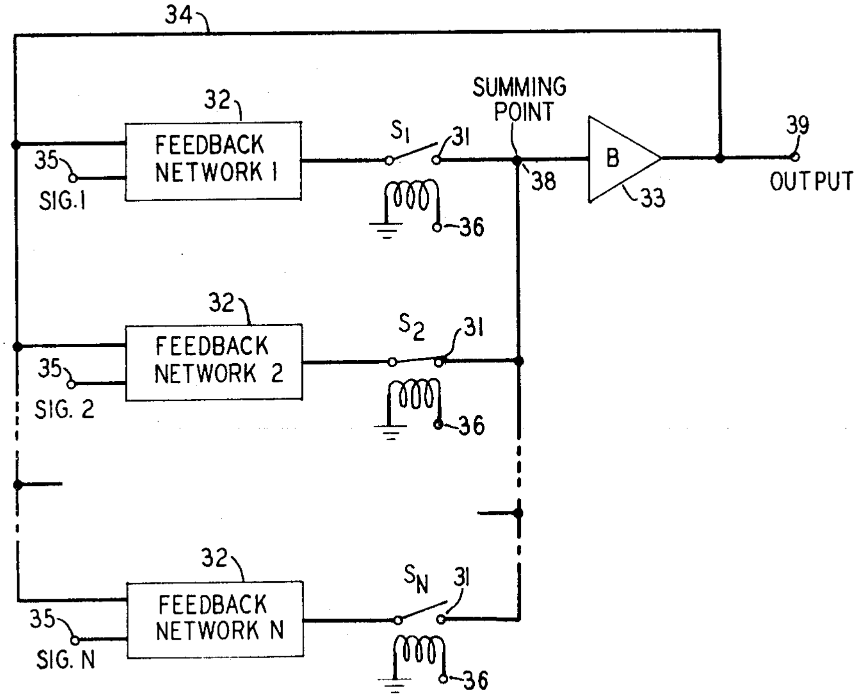
FIG. 3 is a schematic representation of a device of the disclosed class which is modified to allow the use of simple switches.

FIG. 3 shows a network modified to allow the use of simple switches. Here, the output amplifier 33 must be an inverting amplifier. Also, the gate generator must close one switch before opening the other in order to maintain closure of the feedback loop.

Figure 4:
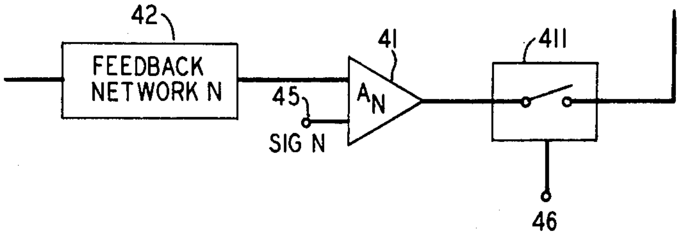
FIG. 4 is a schematic representation of the use of separate switching and amplifying elements.

For purposes of illustration, the amplifiers 11, 21 of the array have been pictured as gated differential amplifiers. Among the many other devices a knowledgeable practitioner might substitute therefor, are a single input gated amplifier with a nonsymmetric port for introduction of the feedback signal and an ungated amplifier (single input of differential input) with a separate switching element 411 (see FIG. 4). The separate switching elements 31, 411 might be electrical or mechanical in nature.

What is claimed is:

1. An electrical network comprising a common portion fed by at least two branch portions, said common portion together with each said branch portion defining a distinct transmission path, each of said transmission paths including at least one amplifying element and each said branch portion including at least one switching means additionally including means for feeding back a signal from the said common portion to each of the said branch portions, each of the feedback loops so defined including at least one said switching means characterized in that said electrical network includes an additional branch portion in addition to said at least two branch portions, said additional branch portion being essentially identical to each of said at least two branch portions with the input port of said additional branch portion held at ground potential when activated and in that the said network comprises means for activating the said additional branch portion when none of the said at least two branch portions are activated.

2. A device of claim 1 including at least one amplifying element in each said portion.

3. A device of claim 2 in which the said amplifying element in each said branch portion incorporated within itself the said switching means.

4. A device of claim 3 in which the said amplifying element combined with the said incorporated switching means constitutes a gated amplifier.

* * * * *

UNITED STATES PATENT OFFICE
CERTIFICATE OF CORRECTION

Patent No. 3,624,538 Dated November 30, 1971

Inventor(s) Edward A. Gere, Hans P. Lie

It is certified that error appears in the above-identified patent and that said Letters Patent are hereby corrected as shown below:

Col. 1, line 13, after "be" delete "proceeded" and insert --processed--.

Col. 4, line 2, after "one" insert --said--; (Claim 2)
line 3, after "said" insert --branch--.

Signed and sealed this 6th day of June 1972.

(SEAL)
Attest:

EDWARD M.FLETCHER,JR.
Attesting Officer

ROBERT GOTTSCHALK
Commissioner of Patents